US009189984B2

(12) United States Patent
Geleijnse et al.

(10) Patent No.: US 9,189,984 B2
(45) Date of Patent: Nov. 17, 2015

(54) APPARATUS AND METHODS FOR ARRANGING MEDIA ITEMS IN A PHYSICAL SPACE BASED ON PERSONAL PROFILES

(75) Inventors: Gijs Geleijnse, Eindhoven (NL); Jonathan Mason, Waalre (NL); Bram Braat, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 233 days.

(21) Appl. No.: 13/320,943

(22) PCT Filed: Apr. 23, 2010

(86) PCT No.: PCT/IB2010/051809
§ 371 (c)(1),
(2), (4) Date: Nov. 17, 2011

(87) PCT Pub. No.: WO2010/136913
PCT Pub. Date: Dec. 2, 2010

(65) Prior Publication Data
US 2012/0066626 A1    Mar. 15, 2012

Related U.S. Application Data

(60) Provisional application No. 61/181,905, filed on May 28, 2009.

(51) Int. Cl.
*G09F 27/00* (2006.01)
*G06Q 30/02* (2012.01)
*G06F 17/30* (2006.01)

(52) U.S. Cl.
CPC ............... *G09F 27/00* (2013.01); *G06Q 30/02* (2013.01); *G06F 17/30029* (2013.01); *G06F 17/3053* (2013.01)

(58) Field of Classification Search
CPC ...................... G06F 17/30; G06F 3/14; G06F 3/1423–3/1446; G06F 1/1605; G06F 1/1613; G06F 17/30861–17/3087; G06F 17/30029; G06F 17/30867; G06F 3/017; G06F 3/0481; G06F 17/3053
USPC ................................................... 715/745–747
See application file for complete search history.

(56) References Cited

U.S. PATENT DOCUMENTS

2003/0078840 A1    4/2003  Strunk et al.
2003/0220835 A1   11/2003  Barnes, Jr.
(Continued)

FOREIGN PATENT DOCUMENTS

EP    1895461 A1    3/2008
EP    1898351 A1    3/2008
JP    2002520689 A   7/2002

OTHER PUBLICATIONS

Chou, P., Gruteser, M., Lai, J., Levas, A., McFaddin, S., Pinhanez, C., Viveros, M., Wong, D., Yoshihama, S., "BlueSpace: Creating a Personalized and Context-Aware Workspace", Dec. 2001, IBM Research Report, pp. 1-7.*

(Continued)

*Primary Examiner* — Claudia Dragoescu
(74) *Attorney, Agent, or Firm* — Larry Liberchuk

(57) ABSTRACT

Apparatus and methods for arranging a set of media items based on user profiles are disclosed. The apparatus includes a processor in communication with user identification ports and a plurality of surfaces for displaying media items. The processor in accordance with the invention receives a user identifier from one of the user identification ports, retrieves a user profile associated with the user identifier, calculates a preference vector for the media items within the set based on the user profile, and directs the plurality of surfaces to change an arrangement of the display of the set of media items from a first configuration to a second configuration based on the preference vector. The processor thereby changes which of the first set of media items is displayed on at least one of the plurality of surfaces.

17 Claims, 5 Drawing Sheets

(56) References Cited

U.S. PATENT DOCUMENTS

| | | | |
|---|---|---|---|
| 2003/0222587 A1* | 12/2003 | Dowling et al. | 315/149 |
| 2005/0044254 A1 | 2/2005 | Smith | |
| 2006/0195789 A1* | 8/2006 | Rogers et al. | 715/727 |
| 2006/0217598 A1 | 9/2006 | Miyajima et al. | |
| 2007/0176920 A1 | 8/2007 | Raijmakers et al. | |
| 2008/0205789 A1* | 8/2008 | Ten Kate et al. | 382/284 |

OTHER PUBLICATIONS

"An article conforming to the formatting of AISB 2008", document made to conform to the ECAI specification, undated.

Dimitrios Raptis et al, "Context-based Design of Mobile Applications for Museums: A Survey of Existing Practices", Human-Computer Interaction Group, ECe Department, undated.

* cited by examiner

APPARATUS AND METHODS FOR ARRANGING MEDIA ITEMS IN A PHYSICAL SPACE BASED ON PERSONAL PROFILES

TECHNICAL FIELD

The present invention is directed generally to the display of media items. More particularly, various inventive methods and apparatus disclosed herein relate to changing an arrangement of a set of media items with respect to a set of displays based on at least one user profile.

BACKGROUND AND SUMMARY

Public spaces in the hospitality domain are typically intended to present an atmosphere that is generally pleasant for users of the public space by employing various kinds of illumination and sounds. Various visual media items, such as images and videos, may be displayed to create such an atmosphere, as well. For example, photographs may be displayed on a plurality of display surfaces in a public space. While the selected media items may create a generally pleasant atmosphere in a public space, some users may not prefer at least some of these media items. Today, however, the atmosphere presented by a public space is rarely modified to suit the individual preferences of one or more users.

Users of a public space may want to connect with other users of the public space. Many studies have shown that hotel guests often want to connect with other hotel guests, want to be surprised, and want to feel special. While the generally pleasant atmosphere in a public space may be an appropriate starting point for a user to connect with other users, the atmosphere may not surprise the user or make the user feel special. Thus, public spaces could be configured to be more amenable to the desires of its users.

The applicants herein recognized that the atmosphere of a public space can be adapted to be more amenable to the desires of its users. The applicants more specifically recognized that the atmosphere of a public space can be adapted based on the profiles of one or more users within the public space.

Accordingly, the present disclosure is directed to inventive apparatus and methods for changing an arrangement of the display of a set of media items based on at least one user profile. For example, although media items in a public space may first be displayed on a plurality of surfaces in a configuration independent of any user profile, the media items displayed on one or more of the plurality of surfaces can be rearranged based on preferences derived from at least one user profile. After a user is identified and located within a public space, surfaces near a user can be directed to display media items with respect to which the user profile indicates a preference. Surfaces farther from the user can be made to display media items previously displayed by surfaces near the user. Thus, a public space can be adapted to be more amenable to the desires of a user.

The apparatus and methods according to various implementations and embodiments of the present invention may make the users of a public space feel special. Such apparatus and methods implemented in a public space may also surprise users. When the apparatus and methods change an arrangement of a display of a set of media items on a plurality of surfaces based on a plurality of user profiles, they may enable users of a public space implementing the invention to connect with other users. In any event, apparatus and methods in accordance with various embodiments of the invention enable public spaces to be modified such that they reflect the preferences of one or more users.

Generally, in one aspect, the invention relates to an apparatus for changing an arrangement of a display of a first set of media items based on at least one user profile. The apparatus includes at least one processor in communication with a plurality of user identification ports and a plurality of devices that control a plurality of display surfaces. The ports and the display surfaces are located together within a physical space. The at least one processor includes an executive module that receives a first user identifier from one of the ports, retrieves a first user profile associated with the first user identifier from memory, calculates a preference vector for the first set of media items based on the first user profile, and directs the plurality of display surfaces to display the first set of media items in a second configuration based on the preference vector. The processor thereby changes which of the first set of media items is displayed on at least one of the plurality of surfaces.

Another aspect of the invention relates to an apparatus for changing an arrangement of a display of a first set of media items based on a plurality of user profiles. Similar to the apparatus just described, this apparatus includes at least one processor in communication with a plurality of user identification ports and a plurality of devices that control a plurality of display surfaces. Again, the ports and the display surfaces are located together within a physical space. The at least one processor includes an executive module that receives a first user identifier from a first port and a second user identifier from a second port, retrieves a first user profile associated with the first user identifier and a second user profile associated with the second user identifier from memory, calculates a first preference vector for the first set of media items based on the first user profile and a second preference vector based on the second user profile. Based on the first and second preference vectors, the executive module directs the devices that control the plurality of display surfaces to change the display of the first set of media items from a first configuration to a second configuration.

Embodiments of either of the foregoing aspects of the invention may further include the plurality of control devices associated with the display surfaces, the surfaces themselves, and/or the plurality of user identification ports. Each of the user identification ports is located within the same physical space as the surfaces and is capable of detecting at least one user identifier.

Yet another aspect of the invention relates to a method for changing an arrangement of a display of a first set of media items on a plurality of surfaces based on at least one user profile. The method includes receiving a first user identifier from one of the ports, retrieving a first user profile associated with the first user identifier from memory, calculating a first preference vector for the first set of media items based on the first user profile. Finally, the method involves directing an arrangement of the first set of media items on the plurality of surfaces to be changed from a first configuration to a second configuration based on the first preference vector. The method thereby changes which of the first set of media items is displayed on at least one of the plurality of surfaces.

Still another aspect of the invention relates to an apparatus for arranging a set of media items based on at least one user profile. The apparatus includes at least one processor in communication with a plurality of user identification ports and a plurality of media output devices. The ports and the output devices are located together within a physical space. The at least one processor includes an executive module that receives a first user identifier from one of the ports, retrieves a first user profile associated with the first user identifier from memory, calculates a preference vector for the first set of media items based on the first user profile, and directs the plurality of display surfaces to display the first set of media items in a second configuration based on the preference vector. Based on the first preference vector, the at least one processor directs the output devices to produce the first set of media items in a second configuration.

Embodiments of the foregoing aspect of the invention may further include the media output devices and/or the plurality of user identification ports. Each of the user identification ports is located within the same physical space as the media output devices and is capable of detecting at least one user identifier. Media output devices refer to any device that can produce a media item, either a prerecorded video and/or audio live, a live media stream, or real-time generated media content. For example, a media output device may be any type of display surface. Additionally, a media output device may be an audio output device such as a speaker that can play at least a portion of an audio file or an audio live stream.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
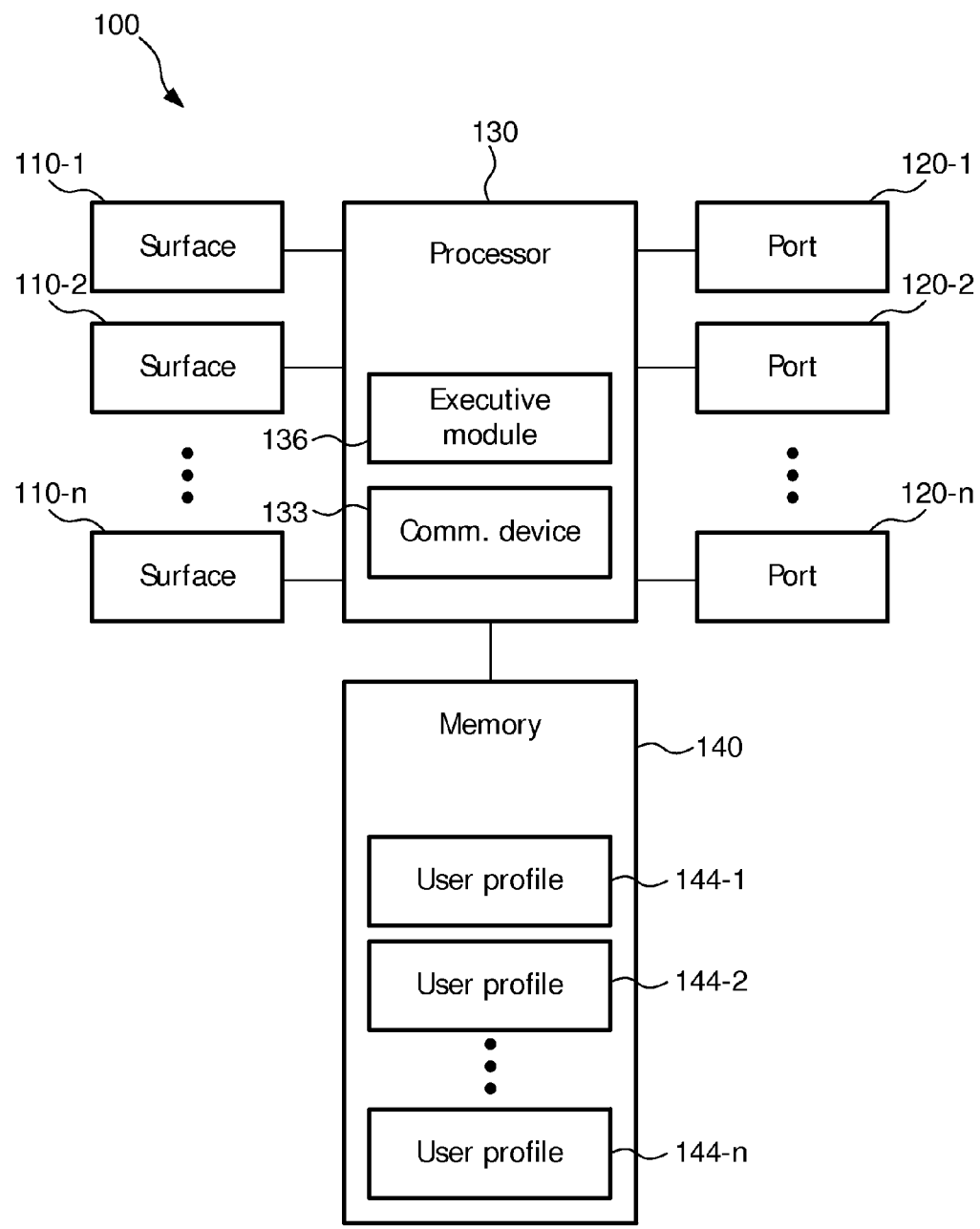
FIG. 1 illustrates an apparatus for changing an arrangement of a display of a first set of media items on a plurality of surfaces based on at least one user profile in accordance with an aspect of the invention.

FIG. 1 illustrates an apparatus 100 for changing an arrangement of a display of a first set of media items on a plurality of surfaces based on at least one user profile in accordance with an aspect of the invention. The apparatus 100 includes a processor 130 including an executive module 136 and a communication device 133. The processor may employ one or more microprocessors that may be programmed using software (e.g., microcode) to perform various functions discussed herein. Further, the processor may be implemented as a combination of dedicated hardware to perform some functions and one or more programmed microprocessors and associated circuitry to perform other functions. Examples of processor components that may be employed in various embodiments of the present disclosure include, but are not limited to, conventional microprocessors, application specific integrated circuits (ASICs), and field-programmable gate arrays (FPGAs). The processor may also be implemented as a group of at least partly redundant components 130-1, ..., 130-n functioning cooperatively together.

In various implementations, processor 130 is associated with memory 140. The memory may be one or more storage media, e.g., volatile and non-volatile computer memory such as RAM, PROM, EPROM, and EEPROM, floppy disks, compact disks, optical disks, magnetic tape, etc. In some implementations, the storage media may be encoded with one or more programs that, when executed on one or more processors and/or controllers, perform at least some of the functions discussed herein. Various storage media may be fixed within a processor or may be transportable, such that the one or more programs stored thereon can be loaded into a processor so as to implement various aspects of the present invention discussed herein. The terms "program" or "computer program" are used herein in a generic sense to refer to any type of computer code (e.g., software or microcode) that can be employed to program one or more processors.

Memory 140 includes a plurality of user profiles 144-1, 144-2, ..., 144-n. Each of the user profiles 144 is associated with a user identifier. The user profiles 144 may be stored within a database in memory 140. A user profile in accordance with the invention may include a variety of types of personal content associated with an individual user. Such personal content may include, for example, the user's home address, nationality, age, gender, alma mater, email, media content, profession, associations with which the user is affiliated, locations visited by user, and/or any disclosed media preferences or categories of media preferences. The user's disclosed media preferences could include, for example, a rating selected by the user indicating the degree to which the user likes or dislikes individual media items. The user's disclosed categories of media preferences could include, for example, a rating selected by the user indicating the degree to which the user likes or dislikes individual categories media items, such as styles or subjects of photography or videos. The user's disclosed media preferences could additionally or alternatively include, for example, lighting preferences related to color, intensity, patterns, times of day, and/or tasks. Different user profiles in the memory may include different types and/or amounts of personal content. Any user profile in the memory may lack personal content that relates to any particular media item or category of media items.

A communication device 133 enables processor 130 to communicate with a plurality of display surfaces 110-1, 110-2, ..., 110-n and a plurality of user identification ports 120-1, 120-2, ..., 120-n. In this embodiment, a display surface refers to any surface that can display visual media of various types or lighting effect of static or dynamic spectrum and/or intensity. A display surface may be, for example, a cathode ray tube, a plasma screen, a liquid crystal display, an array of luminaires, or a lens, filter, or diffuser associated with one or more luminaires. The processor may communicate with display surfaces 110 through a control device (not shown). In this application, a control device refers to any device that can control which media item is displayed on a display surface. A control device may be, for example, a dedicated driver executing on a processor, or a dedicated hardware controller such as an application specific integrated circuit (ASIC).

Additionally or alternatively, communication device 133 enables processor 130 to communicate with a plurality of user identification ports 120-1, 120-2, ..., 120-n. In this application, user identification port refers to any device that can ascertain a user identifier, for example, from a personal device such as a mobile phone, a short message service (SMS) device, a personal digital assistant, a BLACKBERRY device, an IPHONE device, and an RFID tag. A user identification port also refers to any device that can ascertain a user identifier from a card reader or a series of entries on a user interface. The term "user interface" as used herein refers to an interface that enables communication with one or more users of this system. Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

Figure 2:
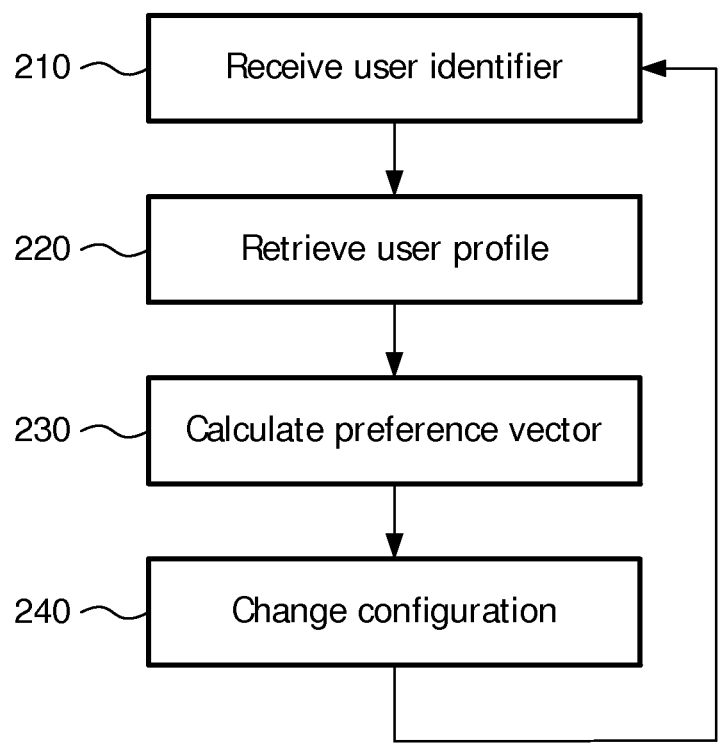
FIG. 2 illustrates a method for changing an arrangement of a display of a first set of media items on a plurality of surfaces based on at least one user profile in accordance with an aspect of the invention.

FIG. 2 illustrates a method for changing an arrangement of a display of a first set of media items on a plurality of surfaces based on at least one user profile in accordance with an aspect of the invention. The method of FIG. 2 can be implemented by an apparatus in accordance with the invention, such as the apparatus of FIG. 1. The method of FIG. 2 begins with the receipt of a user identifier. Step 210 of FIG. 2 involves receiving a user identifier with an indicator of the user's location. In some embodiments, processor 130 receives the user identifier from a user identification port, such as user port 120-1, through communication device 133. In such embodiments, the user identification port that transmits the user identifier may itself serve as the indicator of the user's location. In alternative embodiments, the user identification port may transmit additional user location information to processor 130, either with the user identifier or separately.

Step 220 of FIG. 2 involves retrieving a user profile associated with the user identifier. In some embodiments, processor 130 retrieves the user profile from a database in memory 140 after identifying the user profile associated with the user identifier. Step 230 of FIG. 2 involves calculating a preference vector based on the user profile. In some embodiments, executive module 136 in processor 130 calculates the preference vector based on the user profile. Step 240 of FIG. 2 involves changing a configuration of the display of a plurality of media items by surfaces. In some embodiments, executive module 136 in processor 130 changes the configuration by selecting which surface displays which of the media items in the first set based on the preference vector, and directing a control device associated with at least one surface to change the media item displayed by that surface via communication device 133.

The method illustrated in FIG. 2 may further change the arrangement of the display of the first set of media items on the plurality of surfaces when a second user identifier is received in accordance with an aspect of the invention. Again, the method illustrated in FIG. 2 may further change the arrangement of the display of the first set of media items on the plurality of surfaces when a third user identifier is received in accordance with an aspect of the invention. Moreover, the method illustrated in FIG. 2 may continue to change the arrangement of the display of the first set of media items each time a new user identifier is received until a maximum number of user identifiers have been received. The maximum number of user identifiers—and, therefore, the maximum number of users able to interact with the apparatus 100—is generally determined by the number of available user identification ports.

The method of FIG. 2 may further associate a time with the receipt of a first user identifier from a particular port. Accordingly, the method of FIG. 2 may continue to apply the preference vector calculated based on the user profile associated with the user identifier for a predetermined period following its receipt. After the predetermined period following receipt of the first user identifier, the apparatus may be returned to the default configuration if no other user identifiers have been received. The apparatus may return to the default configuration immediately after the predetermined period or gradually beginning at the expiration of the predetermined period. The method of FIG. 2 may thus require repeated receipt of the first user identifier for the continued application of the preference vector based on the first user profile. Alternatively, the method of FIG. 2 may apply the preference vector based on the first user profile until a second user identifier is received from the port that transmitted the first user identifier. Still alternatively, the method of FIG. 2 may gradually reduce the effect of the preference vector associated with the first user profile.

Figure 3:
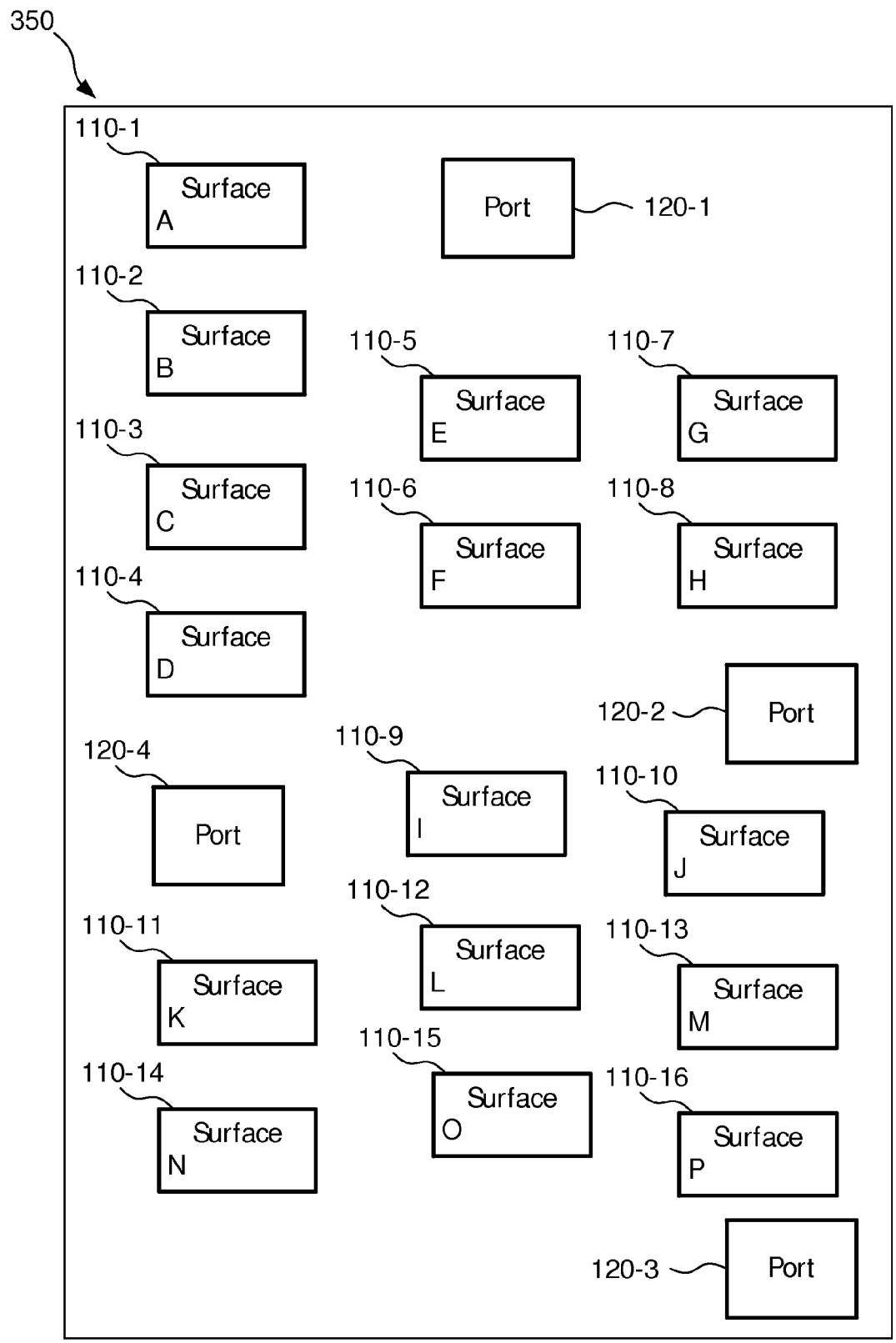
FIG. 3 illustrates a first arrangement of a display of a first set of media items on a plurality of surfaces by an apparatus in accordance with the invention.

FIG. 3 illustrates a first configuration 300 of a display of a first set of media items on a plurality of surfaces by an apparatus in accordance with the invention. As illustrated in FIG. 3, an exemplary physical space 350 includes a plurality of surfaces 110-1 through 110-16 and a plurality of user identification ports 120-1 through 120-4. Both the surfaces and the ports in FIG. 3 are distributed within the space. None of the ports 120-1 through 120-4 in the space have detected a user identifier indicating the presence of an individual user with the space. Accordingly, in FIG. 3, the first set of media items A through P are displayed on surfaces 110-1 through 110-16 in the first configuration by default. As illustrated in FIG. 3, each surface displays a distinct media item. The media items in the first set of media need not each be distinct and include various kinds and types of audiovisual media. For example, media items suitable for use with various implementations of the present invention include static images, video, and sound recordings, including those prerecorded, streamed live, or generated in real time. Suitable media items also include static or dynamic lighting effects generated by a controllable lighting system, for example, LED-based lighting network, based on a predefined set of rules and/or user input.

Figure 4:
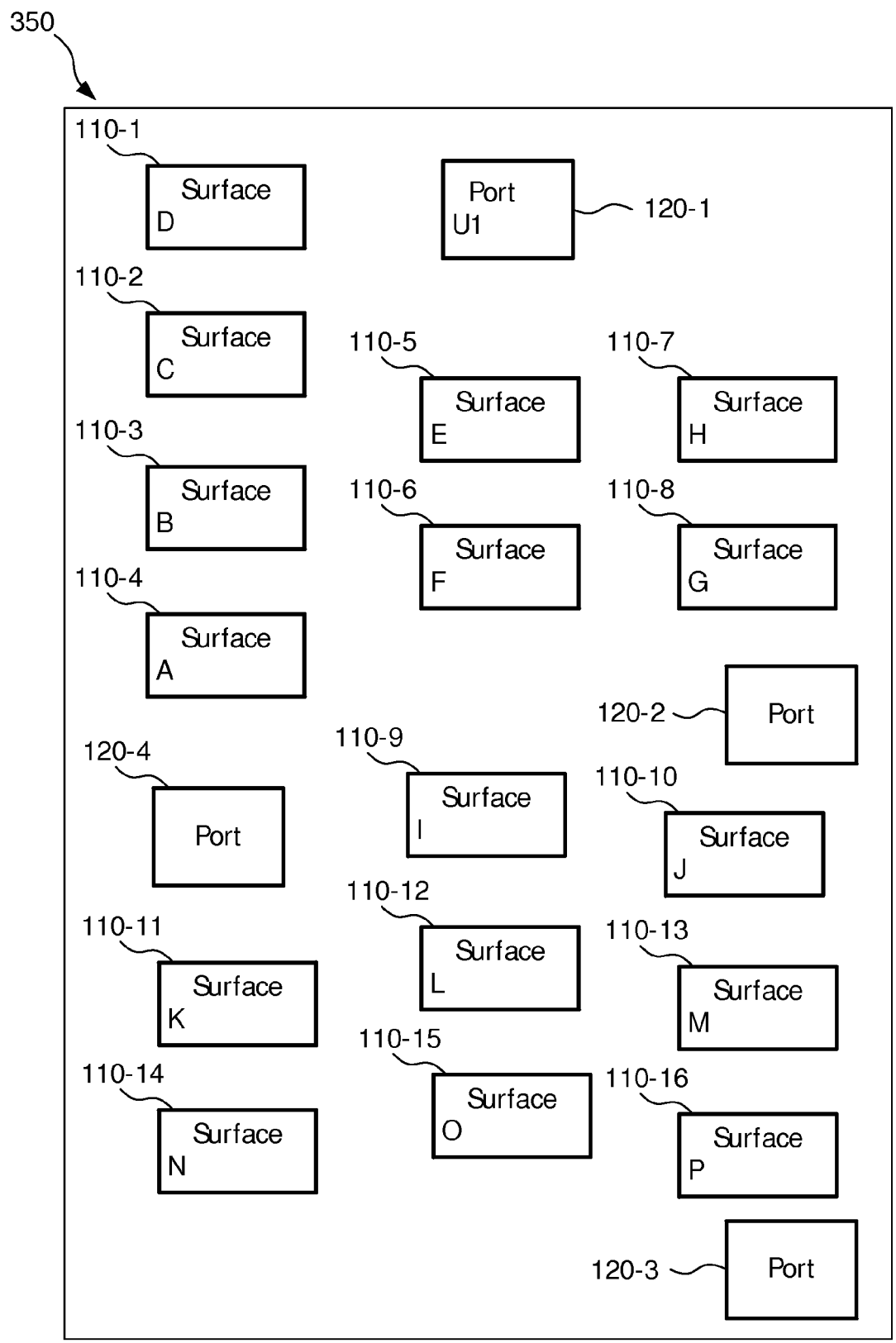
FIG. 4 illustrates a second arrangement of a display of a first set of media items on a plurality of surfaces based on a user profile by an apparatus in accordance with the invention.

FIG. 4 illustrates an exemplary second configuration 400 of the display of the first set of media items on a plurality of surfaces created by an apparatus in accordance with the invention based on a user profile. FIG. 4 illustrates the same exemplary physical space 350 as illustrated in FIG. 3. Accordingly, the physical space illustrated in FIG. 4 also includes the plurality of surfaces 110-1 through 110-16 and the plurality of user identification ports 120-1 through 120-4, distributed within the space as illustrated in FIG. 3. As illustrated in FIG. 4, port 120-1 has detected a user identifier U1 indicating the presence of user U1 with the space. As used in this application, the term user identifier refers to any name, number, code, or series of inputs that can uniquely identify a user within a particular group and/or a particular period of time. For example, a user identifier can be a room number occupied by a hotel guest, a code emitted by an RFID tag, or a mobile phone number.

FIG. 4 illustrates the situation after a processor in accordance with the invention has received the user identifier U1 from port 120-1. After receiving user identifier U1, the processor retrieves the first user profile associated with it and calculates a preference vector for the media items based on the first user profile. For example, if the apparatus of FIG. 1 had been used to create the second configuration of FIG. 4, processor 130 would have retrieved user profile 144-1 that is associated with user identifier U1 from memory 140 and calculate a preference vector for media items A through P based on user profile 144-1. Processor 130 would have then directed the plurality of surfaces 110-1 through 110-16 to display the first set of media items A through P in a second configuration based on the preference vector. Accordingly, in FIG. 4, the display surfaces displaying media items A, B, C, D, G, and H would have changed in comparison to FIG. 3 based on the preference vector calculated based on user profile 144-1.

For simplicity in illustrating the principals of the invention, FIGS. 3 and 4 presume that each of the plurality of surfaces 110-1 through 110-16 can display any of the media items A through P in the first set of media items. For example, each of the plurality of surfaces 110-1 through 110-16 may be a digital screen capable of displaying any of digital images A through P. Nonetheless, it is within the scope of the invention that surfaces 110-1 through 110-16 include a variety of types of surfaces, not all of which are capable of displaying each of the media items A through P. In such embodiments, a processor in accordance with the invention will factor in the capabilities of each surface in determining which surface displays which media item based on the preference vector.

Also for simplicity in illustrating the principals of the invention, FIGS. 3 and 4 presume that each of and the plurality of user identification ports 120-1 through 120-4 are capable of detecting any user identifier by the same means. In such embodiments, where the plurality of surfaces 110-1 through 110-16 are arranged within a hotel lobby, for example, the plurality of user identification ports 120-1 through 120-4 may be selected to detect a user identifier only by the user's hotel card key. Nonetheless, it is within the scope of the invention that ports 120-1 through 120-4 may include a variety of types of ports, some of which have a different and/or greater capacity for detecting user identifiers than others. In such an embodiment, for example, ports 120-1, 120-2, and 120-3 may each be capable of detecting a user identifier from the user's hotel card key, but 120-4 may further be capable of detecting a user identifier by a series of entries on a user interface. In another exemplary embodiment, ports 120-1 and 120-2 may each be capable of detecting a user identifier only from an RFID tag, whereas ports 120-3 and 120-4 may be capable of detecting a user identifier only from a series of entries on a user interface.

Media items E and F remain displayed by surfaces 110-5 and 110-6 respectively in FIG. 4, as in FIG. 3. The media items displayed by surfaces 110-5 and 110-6 may remain the same because the preference vector based on user profile 144-1 indicates that the surfaces are already displaying media items consistent with preferences suggested by that profile. Alternatively, the media items displayed by surfaces 110-5 and 110-6 may remain the same because the preference vector based on user profile 144-1 includes no preferences suggested by that profile. Still alternatively, the media items displayed by surfaces 110-5 and 110-6 may remain the same because the developer established that those surfaces were to remain invariant.

Media item H is displayed by surface 110-7 in FIG. 4, rather than by surface 110-8 as illustrated in FIG. 3, because the preference vector based on user profile 144-1 indicates that user U1 prefers media item H over media item G, which was previously displayed by surface 110-7 and surface 110-7 is closer to port 120-1 than surface 110-8. The preference vector based on user profile 144-1 may indicate that user U1 prefers media item H over media item G or that user U1 prefers a category of media items with which media item H is associated over a category of media items with which media item G is associated. The preference indicator in user profile 144-1 may be, for example, a rating of media item H and/or media item G. Alternatively, the preference indicator in user profile 144-1 may be, for example, a user's media content that shares a similarity with media item H or dissimilarity with media item G. If the user's media content include a plurality of landscape photographs, for example, it may suggesting a preference for media item H if media item H is categorized as a landscape photograph. As another example, if the user's email includes the word "France", it may suggest a preference for media item H if media item H is categorized as a picture of France. Algorithms may be used to calculate a preference level for each media item.

Similarly, media item A, B, C, and D are displayed by surfaces 110-4, 110-3, 110-2, and 110-1 respectively in FIG. 4, rather than by surfaces 110-1, 110-2, 110-3, and 110-4 respectively as illustrated in FIG. 3, because user profile 144-1 includes an indicator that user U1 prefers media item D over media item C, media item C over media item B, and media item B over media item A. In FIG. 4, the most preferred media item D among media items A, B, C, and D is displayed by the surface 110-1 closest to port 120-1, the second most preferred media item C among media items A, B, C, and D is displayed by the surface 110-2 next closest to port 120-1, and the third preferred media item B among media items A, B, C, and D is displayed 110-1 by the surface next closest to port 120-1.

In changing the configuration of the display of the media items A, B, C, and D, several different approaches are within the scope of the invention. In some embodiments, the surface displaying the most preferred media item D is changed first. For example, surface 110-1 may be immediately directed to display media item D. Alternatively, surfaces 110-3, 110-2, and 110-1 may each consecutively be directed to display media item D. In some embodiments, the path with respect to which surfaces are consecutively directed to display a preferred new media item is a function of the strength of a relevant preference indicator in the relevant user profile. For example, if media item P were preferred by user U1, surfaces along various paths between surface 110-16 and port 120-1 may display media item P before the final surface designated by the preference vector based on user profile 144-1.

In alternative embodiments, the surfaces displaying each of the preferred media items are changed at the same time. For example, surfaces 110-1 and 110-2 may both be immediately directed to display media items D and C respectively based on the preference vector. In some embodiments, the speed at which surfaces are directed to display a new media item is a function of the strength of a relevant preference indicator in the relevant user profile. In some embodiments, the parameters for changing a display configuration are part of the relevant user profile.

Figure 5:
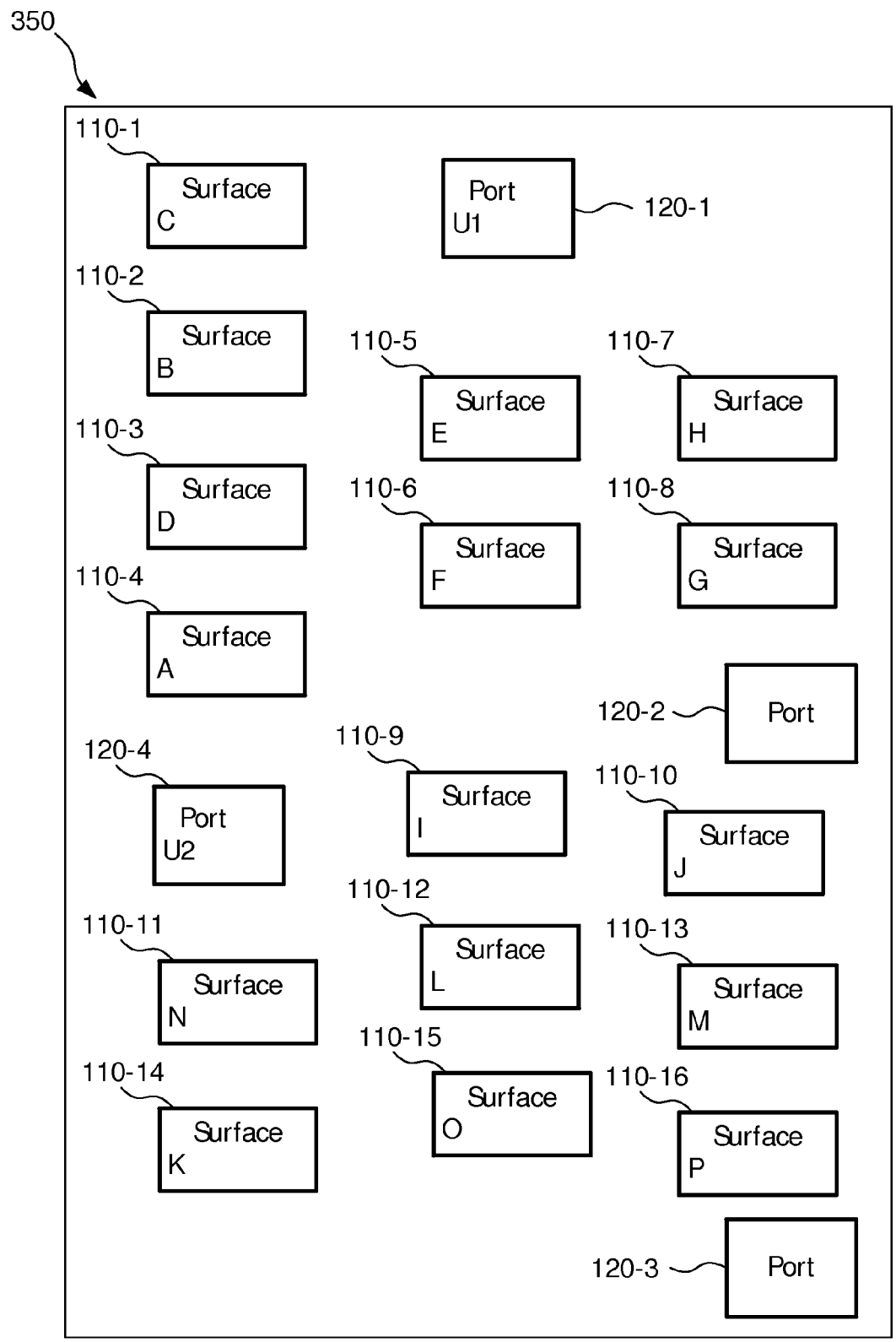
FIG. 5 illustrates a third arrangement of a display of a first set of media items on a plurality of surfaces based on a plurality of user profiles by an apparatus in accordance with the invention.

FIG. 5 illustrates an exemplary third configuration 500 of a display of a first set of media items on a plurality of surfaces created by an apparatus in accordance with the invention based on two user profiles. FIG. 5 illustrates the same exemplary physical space 350 as illustrated in FIGS. 3 and 4. Accordingly, the physical space illustrated in FIG. 5 includes the plurality of surfaces 110-1 through 110-16 and the plurality of user identification ports 120-1 through 120-4, distributed within the space as illustrated in FIGS. 3 and 4. As illustrated in FIG. 5, port 120-1 has detected a first user identifier U1 indicating the presence of a first user U1 within the space 350 and port 120-4 has detected a second user identifier U2 indicating the presence of a second user U2 within the space 350.

FIG. 5 illustrates the situation after a processor in accordance with the invention has received the user identifier U1 from port 120-1 and the second user identifier U2 from port 120-4. After receiving first user identifier U1 and second user identifier U2, the processor would have retrieved user profiles associated with each of the two user identifiers. For example, if the apparatus of FIG. 1 were used to created the third configuration of FIG. 5, processor 130 would have retrieved user profile 144-1 that is associated with user identifier U1 and user profile 144-2 that is associated with user identifier U2 from memory 140, and calculate a preference vector for media items A through P based on user profile 144-1 and user profile 144-2. Processor 130 then would have directed the plurality of surfaces 110-1 through 110-16 to display the first set of media items A through P in a third configuration based on the two preference vectors. Accordingly, in FIG. 5, the surfaces displaying media items B, C, D, N, and K would be changed in comparison to FIG. 4 based on the preference vectors calculated based on user profiles 144-1 and 144-2.

Media item N is displayed by surface 110-11 in FIG. 5, rather than by surface 110-14 as illustrated in FIG. 4, because user profile 144-2 includes an indicator that user U2 at port 120-4, who is closer to surface 110-11 than surface 110-14, prefers media item N over media item K, which was previously displayed by surface 110-11. The indicator in use profile 144-2 may indicate that user U2 likes media item N or a category of media items with which media item N is associated, or that user U2 dislikes media item K or a category of media items with which media item K is associated.

Similarly, media items A, B, C, and D are displayed by surfaces 110-4, 110-2, 110-1, and 110-3 respectively in FIG. 5 rather than by surfaces 110-4, 110-3, 110-2, and 110-1 respectively as illustrated in FIG. 4 because user profile 144-2 includes an indicator that user U2 prefers media item D over media items C and B. The surfaces displaying media items A, B, C, and D in FIG. 5 may not be solely dictated by the second preference vector. The first preference vector is also used to determine which media items are displayed on which surfaces. For example, user profile 144-2 may also include an indicator that user U2 prefers media item D over media item A, in addition to preferring media item D over media items C and B. As illustrated in FIG. 5, since users U1 and U2 both prefer media item D, the preference vectors indicated that media item D should be displayed by a surface between port 120-1 and port 120-4. In FIG. 5, processor 130 has specifically selected surface 110-3 as the surface between port 120-1 and port 120-4 to display media item D.

Again, in changing the configuration of the display of the media items B, C, and D, several different approaches are within the scope of the invention. In some embodiments, the surface displaying media item D is changed first. For example, surface 110-3 may be immediately directed to display media item D. Alternatively, surfaces 110-2 and 110-3 may each consecutively be directed to display media item D. In some embodiments, the surfaces displaying each of the preferred media items are changed at the same time. For example, surfaces 110-1 and 110-2 may both be immediately directed to display media items C and D respectively based on the preference vector. In some embodiments, the speed at which surfaces are directed to display a new media item is again a function of the strength of a relevant preference indicator in the relevant user profile.

One or more of surfaces 110-1 through 110-16 in FIGS. 3, 4, and 5 may more broadly represent a media output device in accordance with an aspect of the invention. Similarly, methods and apparatus in accordance with an aspect of the invention may more broadly include directing media output devices to produce various types of media or a processor that performs that step, either directly or through device drivers. In embodiments of the invention in which one or more of surfaces 110-1 through 110-16 in FIGS. 3, 4, and 5 represents a media output device, at least one of the media output devices may be a speaker and at least one media items A through P may be a prerecorded audio file or a live audio stream. In such embodiments, a user profile 144 may include a volume preference for one or more types of audio files, a preference for music style or tonal balance, or a content preference for an audio filing including spoken communication. To the extent changing the configuration of the first set of media items in such an embodiment involves changing the media output device producing an audio file, the original configuration must include at least two media output devices capable of producing the audio file.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, and configurations described herein are meant to be exemplary and that the actual parameters, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for changing an arrangement of a display of media items based on a user profile, the apparatus comprising:
   a plurality of devices arranged in a physical space for displaying distinct media items assigned to each of the plurality of devices in at least a default configuration, each media item is selected from an image, a video, and a selected light source radiation;
   a plurality of ports configured to detect and identify a user present in the physical space or a plurality of users present in the physical space simultaneously; and
   at least one processor in communication with the plurality of ports and the plurality of devices, the at least one processor being configured to:
   retrieve a profile associated with an identified user,
   calculate a preference vector for the media items based on the retrieved profile,
   assign a media item to each one of the plurality of devices to form a non-default configuration based on the preference vector such that media items that are most preferred by each user are displayed on devices that are nearest a port that detects the identified user.

2. The apparatus of claim 1, wherein at least one of the plurality of devices displays a different media item in the default configuration and in the non-default configuration.

3. The apparatus of claim 1, wherein the profile indicates preferences of the identified user for the media items.

4. The apparatus of claim 1 wherein, in the non-default configuration, the media items are displayed in accordance to proximity of the plurality of devices to the port where each user is detected and identified.

5. The apparatus of claim 4, wherein a speed at which the display changes from the default configuration to the non-default configuration corresponds to a strength of an indicator in the preference vector that the user prefers the non-default configuration over the default configuration.

6. An apparatus for arranging a display of media items based on user profiles, the apparatus comprising:
   a plurality of devices arranged in a physical space for displaying distinct media items assigned to the plurality of devices in at least a default configuration, each media item is selected from an image, a video, and a selected light source radiation;
   a plurality of ports configured to detect and identify a plurality of users present in the physical space simultaneously; and
   at least one processor in communication with the plurality of ports and the plurality of devices, the at least one processor being configured to:
   retrieve profiles associated with each of the plurality of identified users, calculate a preference vector for the media items for each of the plurality of identified users based on each user's profile, and
   for each of the plurality of identified users assign a media item to each one of the plurality of devices to form a non-default configuration based on the preference vector such that media items that are most preferred by each user are displayed on devices that are nearest a port that detects each user.

7. The apparatus of claim 6, wherein the device closest to the port where a first user was identified is an initial device for the non-default configuration, and the preference vector includes an indicator of preference for the media item.

8. The apparatus of claim 6, wherein the processor is further configured to, for each of the identified users, identify an indicator in the profile that the user prefers a first media item over a second media item.

9. The apparatus of claim 8, wherein for each of the plurality of identified users, in the non-default configuration the media items are displayed in accordance to proximity of the plurality of devices to the port where each user is detected and identified.

10. A method for changing an arrangement of a display of media items on a plurality of devices based on at least one user profile, the method comprising acts of:
    providing a plurality of devices arranged in a physical space for displaying distinct media items assigned to the plurality of devices, and a plurality of ports configured to detect and identify a user present in the physical space or a plurality of users present in the physical space simultaneously, each media item is selected from an image, a video, a selected light source radiation, and a portion of a sound recording;
    receiving from the port an indication that a user is detected and identified;
    retrieving a profile associated with the identified user;
    calculating a preference vector for the media items based on the retrieved profile; and
    assigning a media item to each one of the plurality of devices based on the preference vector such that media items that are most preferred by each user are displayed on devices that are nearest a port that detects each user.

11. The method of claim 10, wherein the profile indicates preferences of the identified user for the media items.

12. The method of claim 11, wherein the profile includes an indicator that the user prefers a first media item over a second media and further comprises an act of comparing a rating of the first media item with a rating of the second media item.

13. The method of claim 11, wherein the profile indicates that the user prefers a first media item over a second media item and further comprises an act of determining that the first media item falls within a highly-rated category and the second media item does not.

14. The method of claim 11, further comprising an act of directing the device displaying a first media item to display a second media item and the device displaying the second media item to display the first media item.

15. An apparatus for arranging a display of media items based on at least one user profile, the apparatus comprising:
    a plurality of media output devices arranged in a physical space for producing distinct media items assigned to the plurality of output devices in at least a default configuration, each media item is selected from an image, a video, a selected light source radiation, and a portion of a sound recording;
    a plurality of ports configured to detect and identify a user present in the physical space or a plurality of users present in the physical space simultaneously; and
    at least one processor in communication with the plurality of ports and the plurality of media output devices, wherein the at least one processor is configured to, for each identified user retrieve a profile associated with the user,
calculate a preference vector for the media items based on the retrieved profile, and
assign a media item to each one of the plurality of media output devices to produce a non-default configuration in accordance with the preference vector such that media items that are most preferred by each user are displayed on devices that are nearest a port that detects each user.

16. The apparatus of claim 15, wherein in the non-default configuration the media output device displaying a first media item is directed to display a second media item and the media output device displaying the second media item is directed to display the first media item.

17. The apparatus of claim 16, further comprising at least one controllable lighting network, wherein the processor is further configured to generate a control signal directed to the at least one controllable lighting network based on a plurality of adjustments indicated in the non-default configuration.

* * * * *